Patented June 12, 1951

2,556,523

UNITED STATES PATENT OFFICE 2,556,523

HASTENING SPROUTING OF DORMANT BUDS

Frank Earl Denny, Yonkers, N. Y., assignor to Boyce Thompson Institute for Plant Research, Inc., a corporation of New York No Drawing. Application December 4, 1948, Serial No. 63,621

4 Claims. (Cl. 71—2.5)

This invention relates to the growth of plants and has for its object the provision of an improved method of hastening the sprouting and growth of dormant buds, especially to shorten the period of rest or dormancy.

I have discovered that aqueous solutions of a compound of the group consisting of benzotriazole, and its benzene ring substituted methyl, chloro- and nitroderivatives are very effective for arresting the dormant period of buds and hastening their sprouting and growth. The dormant buds may be treated by contact with the compounds in any suitable form or preparation, such as dusts, vapors, in aqueous solution, and in solutions of organic solvents.

One of the advantageous features of the invention is that very small amounts of the compounds are effective, and in view of their low cost, the treatment is relatively inexpensive. Aqueous solutions containing from $1/9\%$ to $1\%$ of benzotriazole have proved to be very effective, while aqueous saturated solutions of methyl, chloro- and nitro-derivatives may be used because of their low solubility in water.

In the treatment of dormant potatoes, for example, the potatoes may be used whole or cut into small pieces each containing one eye or bud and contacted with one of the compounds. One satisfactory method of treating potatoes is to dip them in an aqueous solution, remove them from the solution, store them for a suitable period, say, about twenty hours, and then plant them. The compounds are not highly volatile and the treated potatoes may accordingly be stored in sacks, crates, or field boxes eliminating the need of tightly closed containers, as in certain practices heretofore. In one case potatoes treated during October developed buds which appeared above the ground in fourteen days.

I claim:

1. The method of treating dormant buds to hasten sprouting which comprises treating the buds with an aqueous solution of a compound of the group consisting of benzotriazole and its benzene ring substituted methyl, chloro- and nitro-derivatives.

2. The method of treating dormant buds to hasten sprouting which comprises contacting the buds with a compound of the group consisting of benzotriazole and its benzene ring substituted methyl, chloro- and nitro-derivatives dispersed in a carrier medium.

3. In the method of claim 2 treating potatoes with a solution containing from $1/9\%$ to $1\%$ of the benzotriazole.

4. The method of hastening the sprouting of potatoes comprising immersing dormant potatoes in an aqueous solution of a compound of the group consisting of benzotriazole and its benzene ring substituted methyl, chloro- and nitro-derivatives.

FRANK EARL DENNY.

REFERENCES CITED

The following references are of record in the file of this patent:

UNITED STATES PATENTS

| Number | Name | Date |
|---|---|---|
| 1,628,035 | Denny | May 10, 1927 |
| 2,341,868 | Hitchcock | Feb. 15, 1944 |